Oct. 12, 1926.
C. JOHNSON
1,602,580
GARDEN TOOL
Filed March 6, 1925
Fig. 1.
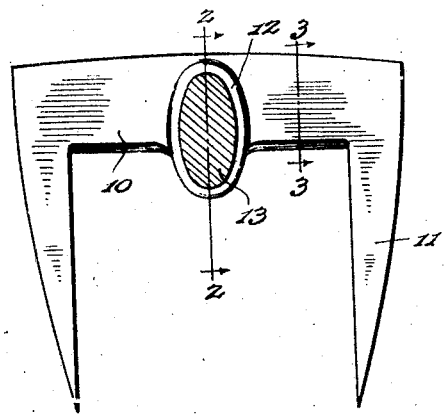
Fig. 2.
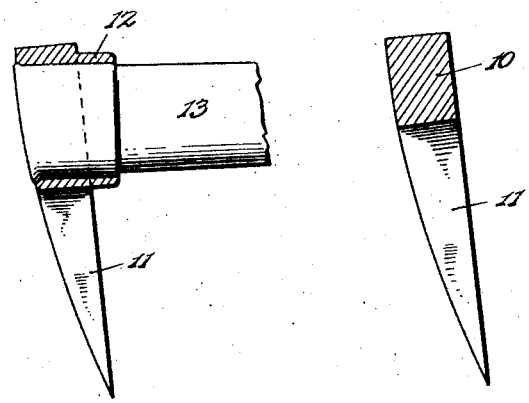
Fig. 3.
Inventor
C. Johnson.
By Lacey & Lacey, Attorneys Patented Oct. 12, 1926.

1,602,580

UNITED STATES PATENT OFFICE.

CHRIST JOHNSON, OF SHELBY, MONTANA.

GARDEN TOOL.

Application filed March 6, 1925. Serial No. 13,481.

This invention relates to an improved pick and seeks, among other objects, to provide a pick which while being adapted for the heavy work of an ordinary pick as now prevalently constructed, will also be well adapted for garden work.

The invention seeks, as a further object, to provide a pick embodying a pair of parallel digging prongs disposed to simultaneously dig into the ground.

And the invention seeks, as a still further object, to provide a pick which will be sturdy in its construction and wherein the pick points will be so formed and connected with each other as to render the tool thoroughly effective in practical use.

Other and incidental objects will appear hereinafter.

In the accompanying drawings:

Figure 1 is a rear elevation of my improved pick.

Figure 2 is a sectional view on the line 2—2 of Figure 1, looking in the direction indicated by the arrows.

Figure 3 is a sectional view on the line 3—3 of Figure 1, looking in the direction indicated by the arrows.

The pick of the present invention is of inverted U-shape and comprises a relatively heavy cross bar 10 at the ends of which is a pair of depending parallel prongs 11. Formed on the cross bar midway between its ends is an elliptical eye 11 which projects below the lower edge of said bar and is tapered to receive a handle 13. The major portion of the eye is disposed parallel with the prongs and is located within the cross bar 10 so as not to obstruct working of the prongs when the tool is in operation. The eye projects beyond the rear face of the cross bar and obtains an extended bearing upon the handle 13, besides serving to reinforce the cross bar 10 and the elliptical or non-circular outline prevents turning of the handle therein. The lower portion of the eye projects below the bottom edge of the cross bar and is of such formation as not to resist the penetrative action of the prongs which may readily enter the ground to the full extent of their length. The bar 10 is, as shown in Figure 3, substantially rectangular in cross section as are also the prongs 11 and, as will be observed, the flat inner faces of the prongs extend flush with the flat rear face of the bar. The prongs are gradually tapered to their free ends and are provided with sharp entering points and, as shown in Figure 1, the flat inner faces of the prongs are parallel. However, the forward faces of the prongs are curved on like arcs to the free ends of the prongs and, as shown in Figure 3, the forward side face of the cross bar 10 is curved to conform to the curvature of the forward side faces of the prongs. Likewise, the outer side faces of the prongs are curved on like arcs to the free ends of the prongs and the end faces of the cross bar are curved to conform to the curvature of the outer side faces of the prongs. The tool is thus rendered symmetrical while the prongs are given a shape such that said prongs will readily enter the ground. The prongs are of a size to withstand heavy work while the cross bar 10 is considerably larger in cross section than the cross section of the prongs respectively so that said cross bar will withstand simultaneous stress on both of the prongs. Furthermore, the tool is relatively heavy or of such weight as to render the tool effective for the purposes of a pick as distinguished from a hoe. Thus, the tool may be used strictly as a pick while, by reason of the fact that the tool is equipped with a pair of prongs, the tool will also be found effective for working gardens or the like.

Having thus described the invention, what I claim is:

A tool comprising a U-shaped head, including a heavy cross bar and integral prongs at the ends thereof projecting in the same direction and curved upon their forward and outer faces and flat upon their inner and rear faces and tapering throughout their length to sharp points, and an elliptic handle receiving eye disposed medially of the bar, and projecting from the bottom and rear side thereof with the major axis at a right angle to the length of the bar.

In testimony whereof I affix my signature.

CHRIST JOHNSON. [L. S.]